Oct. 28, 1924.
E. R. BURTNETT
1,513,310
INTERNAL COMBUSTION ENGINE
Filed Oct. 2, 1922  3 Sheets-Sheet 3
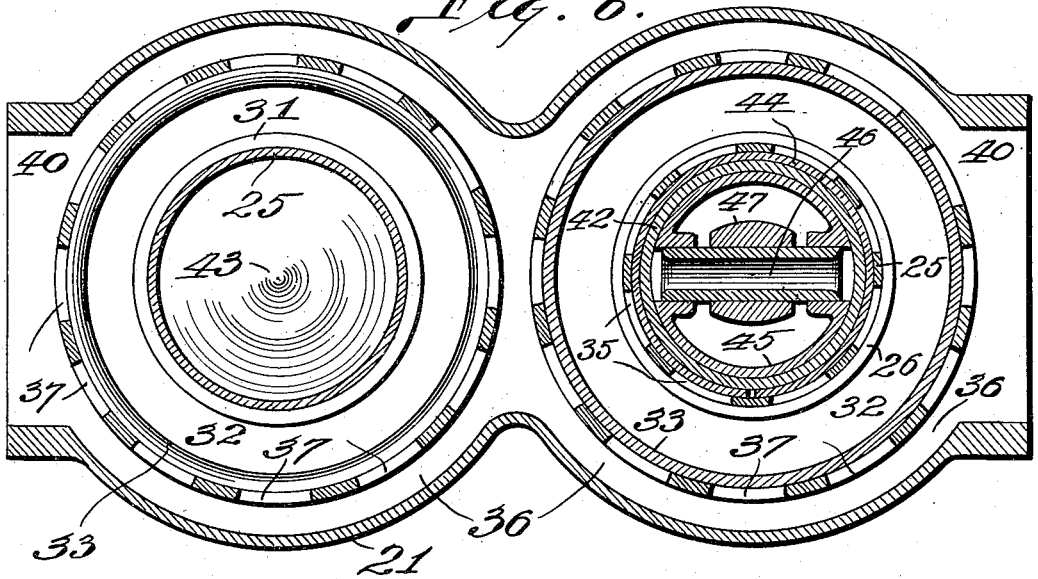
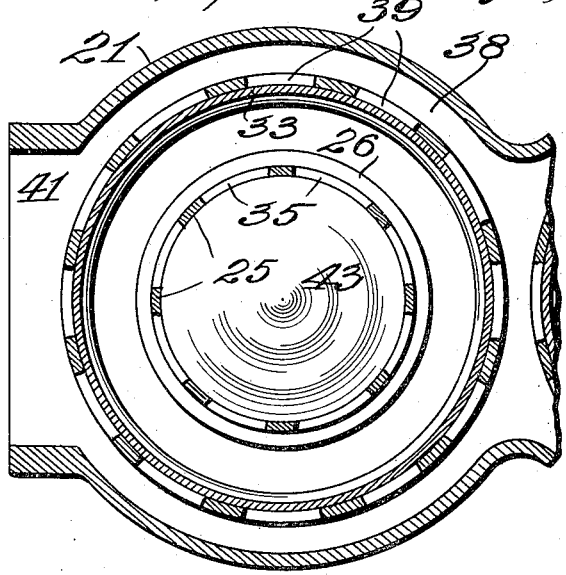
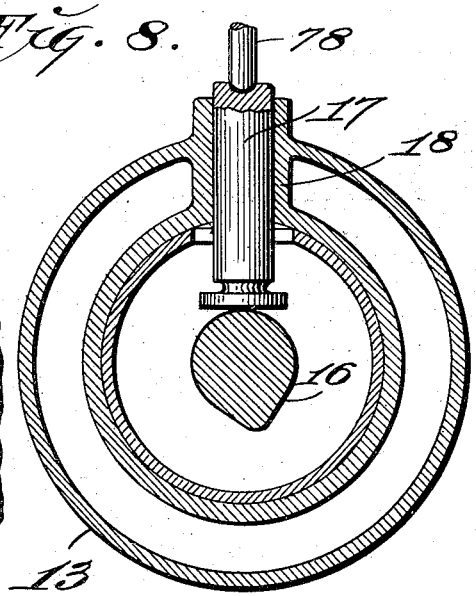
INVENTOR,
Everett R. Burtnett.
By Martin P. Smith, atty.

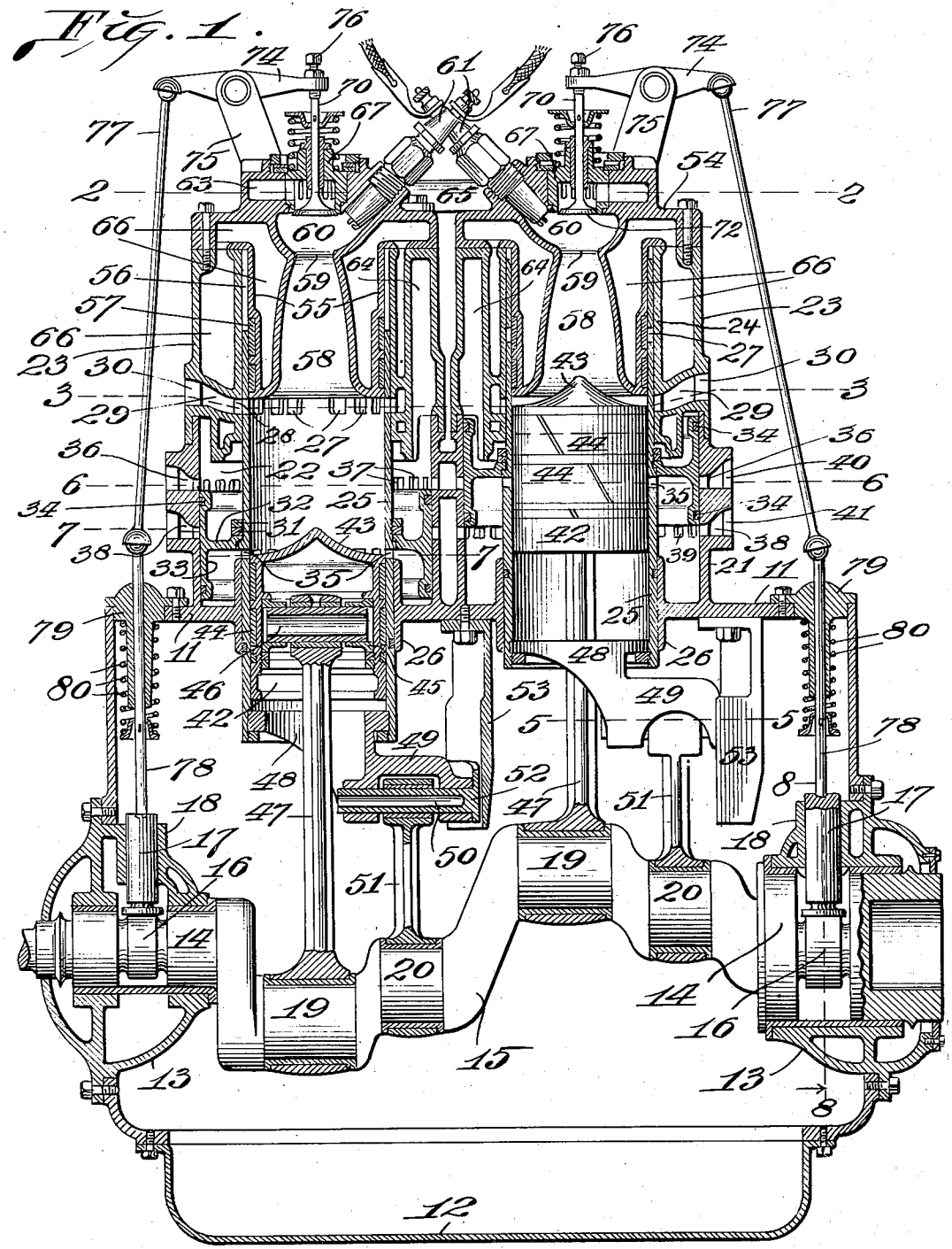

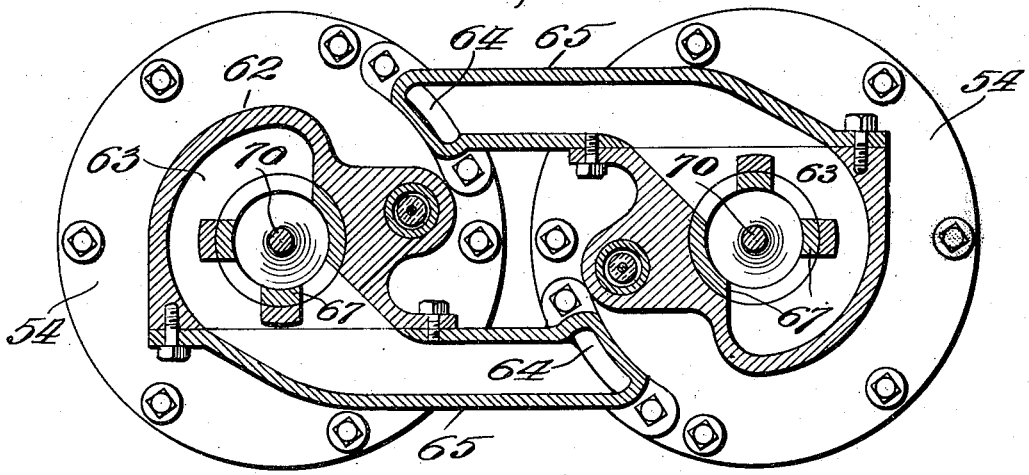
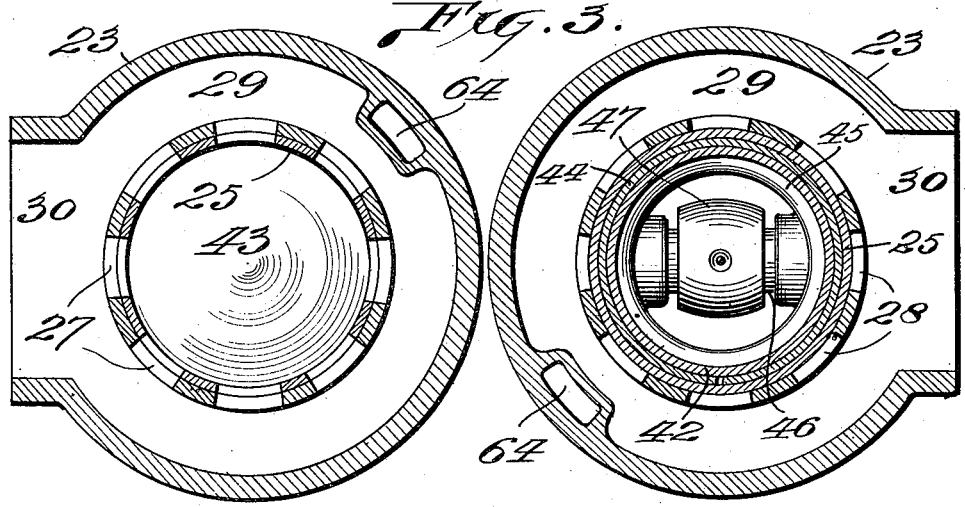
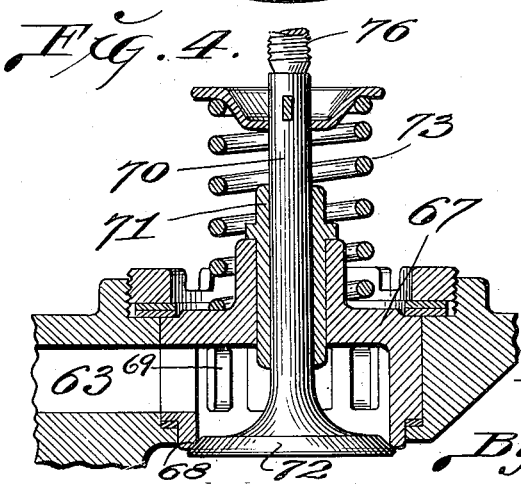
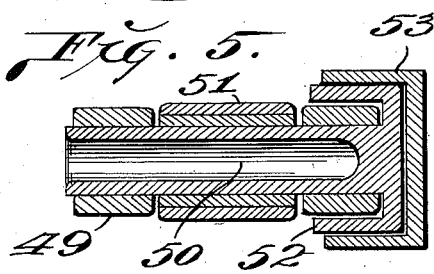

Patented Oct. 28, 1924.

1,513,310

UNITED STATES PATENT OFFICE.

EVERETT R. BURTNETT, OF LOS ANGELES, CALIFORNIA, ASSIGNOR OF ONE-HALF TO CHARLES A. BURTNETT, OF LOS ANGELES, CALIFORNIA.

INTERNAL-COMBUSTION ENGINE.

Application filed October 2, 1922. Serial No. 591,761.

*To all whom it may concern:*

Be it known that I, EVERETT R. BURTNETT, a citizen of the United States, residing at Los Angeles, in the county of Los Angeles, State of California, have invented new and useful Improvements in Internal-Combustion Engines, of which the following is a specification.

My invention relates generally to internal combustion engines, and more particularly to a two-stroke cycle engine operating on a constant inert scavenging volume and variable gas mixture supercharging cycle.

Further, my invention provides a form of cylinder head wherein the stratification of the charge is maintained during compression of the whole or dual charge, and the gaseous mixture will be confined in the head of the cylinder head where one spark plug will have the dual effect of creating instant combustion of the whole combustible charge owing to the nearness of the whole mass of combustible units to the ignition point. Also, the combustion waves will converge toward the middle of the combustion space and meet there, the top line of the stratum of inert volume rather than to let them impinge against the cylinder or piston head walls. The heat of combustion will be absorbed by the inert volume, resulting in a great volume having relatively mild expansive qualities and thus obtaining with the internal combustion engine, more of the desirable character of steam and eliminating the great destructible phenomenon of detonation.

It will be seen that the supercharging of the gaseous mixture adds to the initial pressure at the beginning of the compression stroke—hence with a gained compression clearance, a great increase in compressed combustible volume is obtained, a more constant mean pressure is delivered throughout the expansion stroke, a higher pressure is provided at the time the piston crank is on half stroke, and when the crank is in a position to create the greatest crank torque for a given pressure exerted against the piston head.

Further, a reduction of friction is attained by the use of the two stroke cycle principle and still further by the use of the sleeve valve structure that is actuated by connection with the main crank, which arrangement eliminates an auxiliary cam or eccentric shaft and the attending drive gears.

In my improved engine the sleeve travel is at all times in the same direction with the piston movement but of lesser stroke in inches and consequently reducing the expansion ring stroke travel on the periphery of the cylinder or sleeve wall.

I have created by my invention what I believe to be a practical agency of satisfying a great economical need—an engine that is of relatively simple structure, silent in operation, long lived in operation and exceedingly cheap to produce, comparative to the power output and economy of operation.

With the foregoing and other objects in view, my invention consists in certain novel features of construction and arrangement of parts that will be hereinafter more fully described and claimed, and illustrated in the accompanying drawings, in which—

Figure 1 is a vertical section taken approximately through the center of an engine of my improved construction;

Figure 2 is a horizontal section taken on the line 2—2 of Figure 1;

Figure 3 is a horizontal section taken on the line 3—3 of Figure 1;

Figure 4 is an enlarged detail section taken vertically through the center of one of the gaseous fuel inlet valves and its cage;

Figure 5 is an enlarged horizontal section taken on the line 5—5 of Figure 1;

Figure 6 is a horizontal section taken on the line 6—6 of Figure 1;

Figure 7 is a horizontal section taken on the line 7—7 of Figure 1;

Figure 8 is a horizontal section taken on the line 8—8 of Figure 1.

Referring by numerals to the accompanying drawings, 10 designates a crankcase, having an integral top plate 11 and a removable bottom plate or pan 12 and which latter performs the functions of a lubricating oil sump. Removably arranged in the end walls of case 10 are bearings 13 for the journals 14 of a crank 15.

Each journal is formed with a full inlet valve actuating cam 16, and bearing on the periphery thereof, is a plunger 17 and the latter being arranged for sliding movement in a bearing 18 that is formed in the upper portion of the respective bearing 13.

Shaft 15 is provided with a pair of piston cranks arranged 180° apart and with a pair of sleeve valve cranks 20 that are somewhat shorter than said piston cranks.

Formed integral with and projecting upwardly from plate 11 is a pair of relatively short cylinders 21, having air and gaseous fuel compression chambers 22 and surmounting these cylinders 21 are blocks or cylinders 23 having chambers 24 that are substantially smaller in diameter than said chambers 22.

Arranged for sliding movement within each chamber 24 is the upper portion of a sleeve valve 25, and the lower portion thereof is arranged to slide through a short vertically disposed cylindrical bearing 26 that is formed integral with top plate 11.

Formed through the upper portion of each sleeve 25 is an annular row of exhaust ports 27, which, when said sleeve is at its lowermost limit of movement register with corresponding ports 28 that are formed through the inner wall of the respective cylinder 23.

These ports 28 lead to an annular exhaust chamber 29 that is formed in the lower portion of cylinder 23 and each chamber having a relatively large outlet opening 30, to which may be connected an exhaust manifold (not shown).

Removably arranged on the intermediate portion of each sleeve 25, and retained thereon by one or more internally threaded rings 31 that engage a threaded portion of the surface of said sleeve, is a head 32, having at its outer edge, a ring or cylinder 33 that bears directly against the inner surface of the wall that encloses chamber 23. Arranged in the outer face of each of these rings or cylinders and adjacent to their upper and lower edges are suitable packing rings 34. Formed through the wall of sleeve 25 just below head 32 is an annular row of apertures 35 that permit compressed air to pass from the lower portion of chamber 22 into the chamber within sleeve 25 when the latter and the piston that operates therein are at their lower limits of movement.

Encircling the upper portions of the cylinders 21 are annular gaseous fuel inlet chambers 36 that are in communication with each at a point between the cylinders and formed through the walls of the cylinders so as to establish communication between said chambers 36 and the chambers 22 are gaseous fuel inlet ports 37.

Formed in the walls of the cylinders 21 immediately below the chambers 36 are annular air inlet chambers 38 that have communication with the lower portions of the respective chambers 22 through air inlet ports 39.

When the heads 32 are at the lower ends of their strokes, the fuel inlet ports 37 are uncovered and air inlet ports 39 are covered but when said heads are at the upper ends of their strokes this condition is reversed, that is, ports 37 are covered and ports 39 are uncovered.

Chambers 36 are provided with relatively large gaseous fuel inlet openings 40 and likewise chambers 38 are provided with large air inlet openings 41.

Arranged for reciprocatory movement within each sleeve 25 is a piston 42 having a pointed or conical upper end 43 and arranged in the outer face of said piston are two or more relatively wide packing rings 44. Removably arranged within each piston is a ring 45 and journalled in oppositely disposed bearings thereon are the ends of a wrist pin 46.

Journalled on each wrist pin is the upper end of a pitman or connecting rod 47 and the lower end thereof being journalled on the corresponding crank 19 on shaft 15.

Removably seated in the lower end of each sleeve 25 is a ring 48 and depending from one side thereof is a yoke 49 in which is mounted a wrist pin 50.

Journalled on this wrist pin is the upper end of a pitman or connecting rod 51 the lower end thereof being journalled on the corresponding crank 20. To support and guide the yoke 49 during operation one end of wrist pin 50 is provided with a cross head 52 that is arranged for sliding movement in a vertically disposed guide 53 and which latter is secured to and depends from top plate 11.

Secured in position on top of each cylinder 23 is a plate or block 54 from which depends a cylindrical head 55. This head extends downwardly into the corresponding chamber 24 and as the external diameter of said head is slightly less than the diameter of said chamber 24, a narrow annular space 56 is formed between the head and wall of cylinder 23 and which space accommodates the upper portion of sleeve valve 25.

The lower end of each head 55 terminates in a plane just above the exhaust ports 27 and arranged in the outer face of the lower portion of said head is a plurality of relatively wide packing rings 57 that bear directly against the inner face of sleeve 25.

Formed in head 55 is a substantially bell shaped compression chamber 58 the upper end thereof being connected by a restricted opening 59 to a combined charge compression and ignition chamber or pocket 60 that is formed in the center of the corresponding plate 54.

The terminals of the electrodes of a spark plug 61 project into the pocket 60, said spark plug being seated in plate 54. A housing 62 is formed on top of each plate 54 and leading from the chamber 63 within each housing to a vertically disposed duct 64 in the other cylinder of the engine, is a tubular member 65.

Each duct 64 is formed through plate 54 and extends downward between the inner and outer walls of cylinder 23 and the lower end of said duct communicates directly with the upper end of the corresponding compression chamber 22.

Plates 54, the walls of heads 55 surrounding chambers 58 and the walls of the cylinders 23 are formed with communicating chambers 66, through which a fluid cooling medium such as water is adapted to circulate.

Removably seated in each housing 62 is a valve cage 67, the lower end thereof being provided with an annular valve seat 68, and formed through the side wall of this cage are ports 69 that communicate directly with the chamber 63 in housing 62.

A valve stem 70 is arranged for operation in a bushing 71 in the top of each cage and carried by the lower end of said stem is a valve 72 that normally rests on the corresponding seat 68.

Each valve is normally retained in closed position by an expansive coil spring 73 that is associated with stem 70, and said valve is unseated and opened by means of a rocker arm 74 that is fulcrumed on an adjacent bracket 75.

The inner end of each rocker arm carries an adjustable screw or bolt 76 that bears directly on top of the corresponding valve stem, and the outer end of each rocker arm is engaged by a push rod 77.

The lower end of each push rod 77 is engaged by the upper end of a push rod 78 the latter passing through a bearing 79 in the top plate 11 and associated with each push rod 78 is a compression spring 80. The lower end of each push rod 78 bears directly on top of the corresponding cam actuated plunger 17.

The operation of my improved engine is as follows:

As each piston reaches the upper end of its stroke, or "high center," a stratified charge is compressed within the chamber 58 and pocket 60 and that portion of the charge within said pocket and the upper portion of said chamber being compressed gaseous fuel, with a stratum compressed residual products of combustion in the intermediate portion of the chamber 58 and with a stratum of compressed air in the lower portion of said chamber.

As the piston passes high center, the gaseous fuel within pocket 60 is ignited by a spark produced between the terminals of the corresponding plug 61 and the force of the resulting explosion is transmitted through the strata of products of combustion and air to the head of the corresponding piston.

As the piston is thus moved downward, sleeve 25 will also move downward, but at slower speed due to the difference in throw between cranks 19 and 20 and as the piston approaches its low center, the exhaust ports 27 begin to register with ports 28 thereby permitting a considerable portion of the products of combustion to exhaust through said ports 27 and 28 and through annular chamber 29 and port 30.

While ports 27 and 28 are in registration, the top of piston 42 passes below and uncovers air inlet ports 35, thereby admitting a considerable volume of compound air from that portion of compression chamber beneath head 32, and air being compressed by the downward movement of said head that is carried by sleeve valve 25, and this inrush of compressed air forces the greater portion of products of combustion out through the still open exhaust ports.

While each head 32 is at its low center, gaseous fuel to enter chamber 22 above the head 32 and on the succeeding upward stroke of the sleeve and head, this fuel charge will be compressed in the corresponding duct 64, tubular member 65, chamber 63, and which latter it will be understood is on the opposite cylinder. Thus the upward stroke of each head 32 is utilized for compressing the gaseous fuel charge for the other cylinder.

Immediately after each piston starts on its upward movement and after the exhaust and air inlet ports are closed, the corresponding cam 16 acts through parts 16, 17, 78, 77 and 74 to open the corresponding poppet valve 72, thereby admitting to the corresponding pocket 60 from the adjacent chamber 63, a highly compressed charge of gaseous fuel.

As the piston moves to its high center, the gaseous fuel, residual products of combustion and air will be compressed in stratified relation within the chamber 58 and pocket 60 until the piston passes high center whereupon the compressed charge is ignited as hereinbefore described. The venturi form of the combustion chamber composed of the chamber 58 and pocket 60 insures perfect and uniform diffusion of the flame propagation throughout the compressed fuel charge and as the strata of products of combustion and air lie between the fuel charge and the piston, there is relatively little heat transmitted to the latter from the burning charges of compressed fuel.

Thus it will be seen that I have produced a relatively simple and efficient two cycle engine wherein the air and gaseous fuel portions of the cylinder charges are admitted to the combustion chambers under compression and which air and gaseous fuel charges are, together with the residual products of combustion, compressed in stratified relation prior to the ignition of the fuel portion of each charge.

Obviously the details of construction of my improved engine may be varied in minor details without departing from the spirit of the invention, the scope of which is set forth in the appended claims.

I claim as my invention:—

1. In a two cycle internal combustion engine a pair of cylinders each having a combustion chamber and a compression chamber, a duct leading from the compression chamber of each cylinder to the combustion chamber of the other cylinder, a sleeve valve arranged for operation in each cylinder for controlling the admission of air into the combustion chamber and the exhaust of products of combustion from said chamber and means carried by each sleeve for compressing gaseous fuel and forcing the same through the respective duct into the opposite combustion chamber.

2. In a two cycle internal combustion engine a pair of cylinders each having a combustion chamber and a compression chamber, a duct leading from the compression chamber of each cylinder to the combustion chamber of the other cylinder, a sleeve valve arranged for operation in each cylinder for controlling the admission of air into the combustion chamber and the exhaust of products of combustion from said chamber, means carried by each sleeve for compressing gaseous fuel and forcing the same through the respective duct into the opposite combustion chamber, and a poppet valve for controlling the passage of compressed gaseous fuel from each duct into the respective combustion chamber.

3. In a two cycle internal combustion engine, a pair of cylinders each having a combustion chamber and a compression chamber, a duct leading from the compression chamber of each cylinder to the combustion chamber of the other cylinder, a sleeve arranged for operation within each cylinder and having exhaust ports and air inlet ports and means on said sleeve for compressing gaseous fuel within the respective compression chamber and forcing said compressed fuel through the respective duct into the combustion chamber of the other cylinder and for compressing air within said compression chamber and which compressed air passes to the lower portion of the combustion chamber through the air inlet ports in said sleeve.

In testimony whereof I have signed my name to this specification.

EVERETT R. BURTNETT.